(12) United States Patent
Kettl et al.

(10) Patent No.: US 7,853,393 B2
(45) Date of Patent: Dec. 14, 2010

(54) METHOD AND DEVICE FOR OPERATING AN INTERNAL COMBUSTION ENGINE

(75) Inventors: Thomas Kettl, Atting (DE); Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 61 days.

(21) Appl. No.: 12/301,577

(22) PCT Filed: Apr. 19, 2007

(86) PCT No.: PCT/EP2007/053812

§ 371 (c)(1),
(2), (4) Date: Nov. 19, 2008

(87) PCT Pub. No.: WO2007/137912

PCT Pub. Date: Dec. 6, 2007

(65) Prior Publication Data

US 2009/0319151 A1   Dec. 24, 2009

(30) Foreign Application Priority Data

May 29, 2006   (DE) .................. 10 2006 024 956

(51) Int. Cl.
*G01L 23/22* (2006.01)
*G01M 15/00* (2006.01)
*F02P 5/00* (2006.01)
*F02M 7/00* (2006.01)

(52) U.S. Cl. ............. 701/101; 123/406.17; 123/406.22; 123/406.41; 123/435; 701/111; 701/114; 73/35.12; 73/35.13; 73/114.16

(58) Field of Classification Search ............ 123/406.17, 123/406.22, 406.41, 435; 701/111, 114; 73/35.12, 35.13, 114.16

See application file for complete search history.

(56) References Cited

U.S. PATENT DOCUMENTS

| 5,377,654 A | * | 1/1995 | LoRusso et al. ............. 123/673 |
| 5,474,045 A | * | 12/1995 | Demizu et al. ......... 123/406.47 |
| 2003/0047166 A1 | | 3/2003 | Hess et al. .................. 123/436 |
| 2006/0086176 A1 | | 4/2006 | Piewek et al. .............. 73/35.12 |

(Continued)

FOREIGN PATENT DOCUMENTS

DE   10240492   9/2002

(Continued)

*Primary Examiner*—Stephen K Cronin
*Assistant Examiner*—Raza Najmuddin
(74) *Attorney, Agent, or Firm*—King & Spalding L.L.P.

(57) ABSTRACT

In an internal combustion engine with several cylinders, at least one cylinder is configured as a reference cylinder to which an active cylinder pressure sensor is allocated. A passive cylinder pressure sensor is allocated to each of the remaining cylinders. At least one actuating member is assigned to the cylinders. A crankshaft angle sensor is provided. During the quasi-stationary operating mode, the cylinder segment durations are equated, by an actuating member engaging in at least one actuating signal allocated to the respective cylinder. Furthermore, during the quasi-stationary operating mode, the measuring signal of the active sensor is allocated to the respective measuring signals of the passive sensors. As a result, the signal processing of the measuring signals of the passive sensors is adjusted depending on the respective measuring signals of the passive sensors captured during the quasi-stationary operating mode and on the allocated measuring signal of the active sensor.

10 Claims, 3 Drawing Sheets

U.S. PATENT DOCUMENTS

2006/0095198 A1    5/2006  Damitz et al. ............... 701/114
2006/0241852 A1*  10/2006  Damitz et al. ............... 701/114

FOREIGN PATENT DOCUMENTS

| DE | 10359927    | 12/2003 |
| DE | 102004048330 | 10/2004 |
| DE | 102004051908 | 10/2004 |
| EP | 0411580     | 7/1990  |
| EP | 1593825     | 5/2004  |
| WO | 01/59282    | 8/2001  |

* cited by examiner

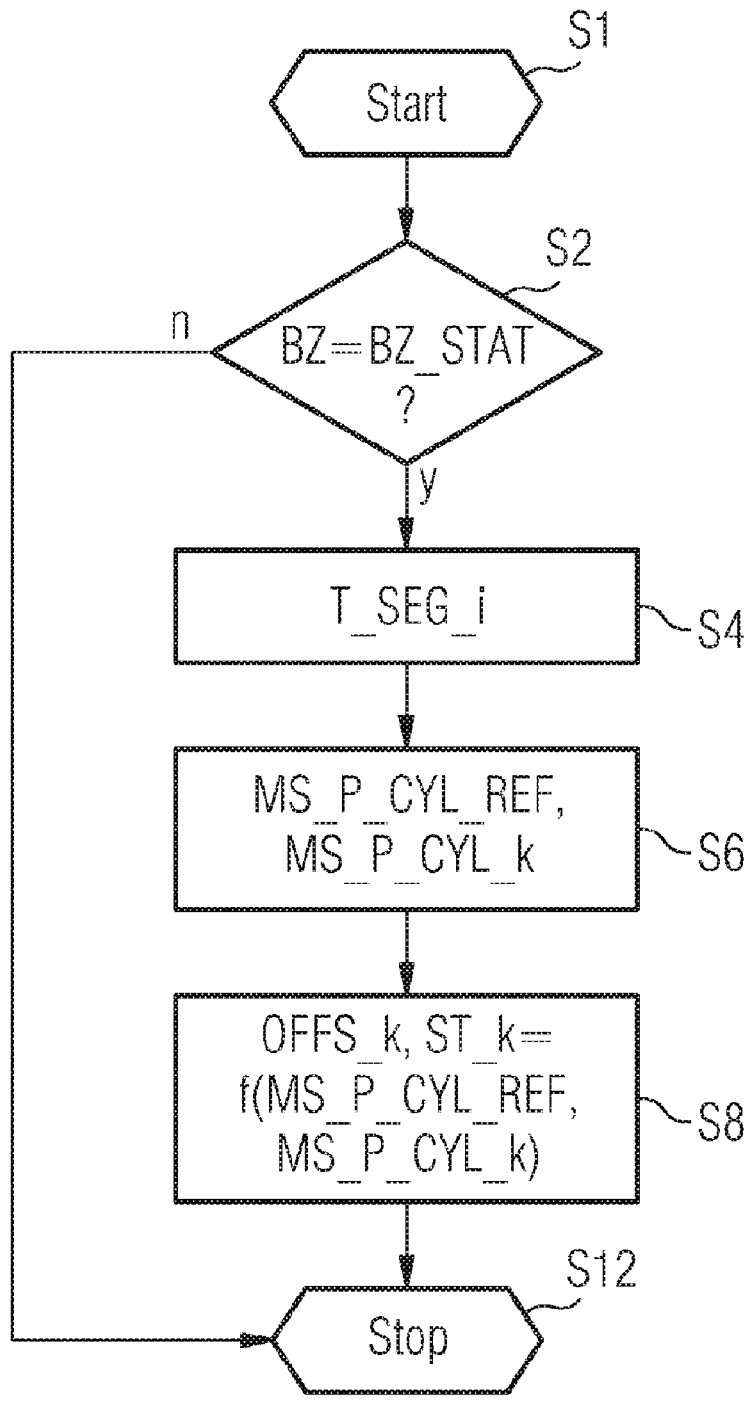

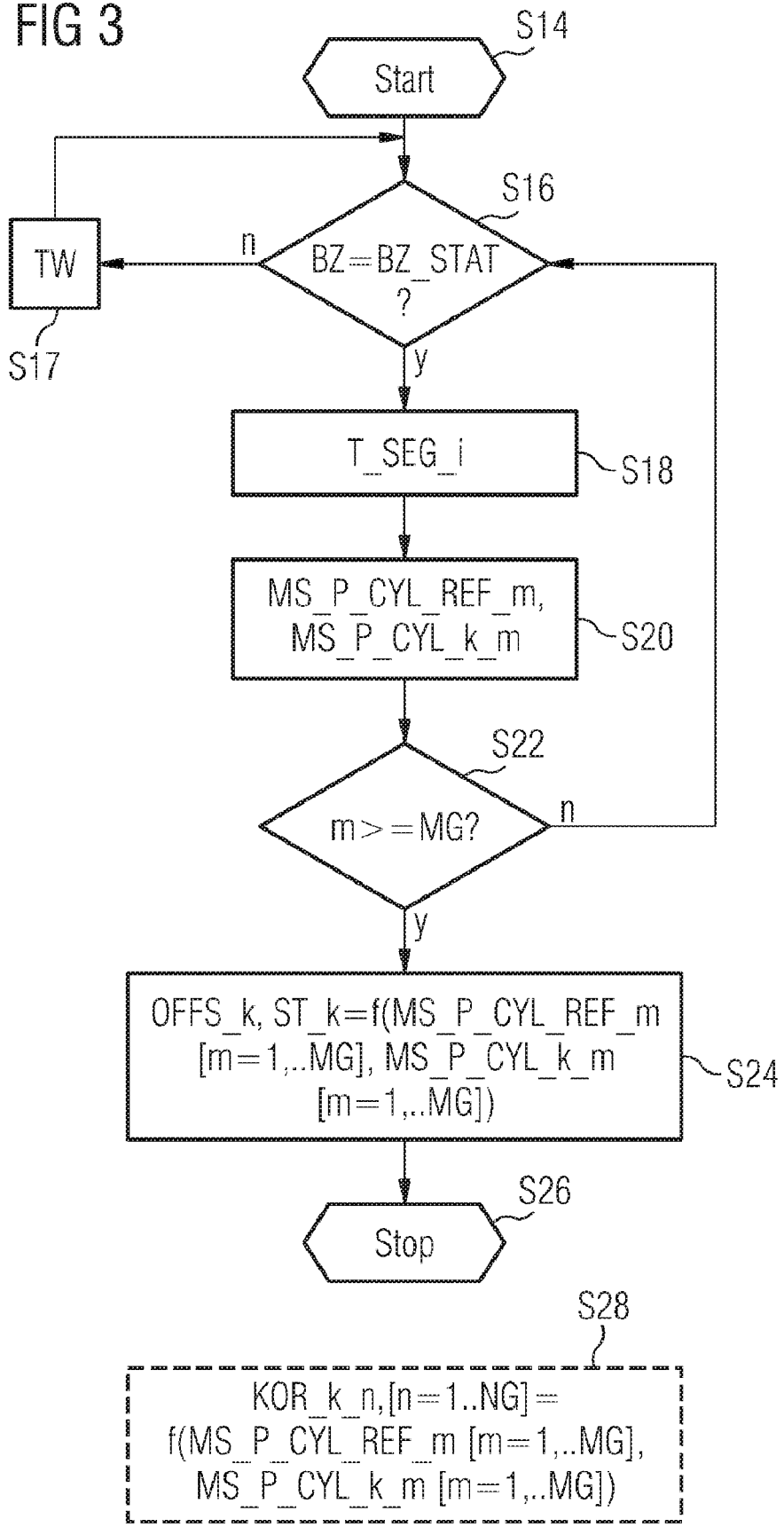

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2007/053812 filed Apr. 19, 2007, which designates the United States of America, and claims priority to German Application No. 10 2006 024 956.9 filed May 29, 2006, the contents of which are hereby incorporated by reference in their entirety.

TECHNICAL FIELD

The invention relates to a method and device for operating an internal combustion engine having a plurality of cylinders.

BACKGROUND

An internal combustion engine of this kind can be e.g. gasoline or diesel powered. Increasingly stringent legal requirements in respect of permissible pollutant emissions by motor vehicles fitted with internal combustion engines make it necessary to keep the pollutant emissions as low as possible during operation of the internal combustion engine. One of the ways in which this can be done is by reducing the emissions which occur during combustion of the air/fuel mixture in each cylinder of the internal combustion engine. Another is to use exhaust aftertreatment systems in internal combustion engines which convert the emissions produced during the combustion process of the air/fuel mixture in each cylinder into harmless substances. The common feature of all the approaches is that that precise determination of operating variables, particularly engine load, can provide a suitable means of minimizing the pollutant emissions.

Moreover, exacting requirements with regard to drivability also necessitate precise determination of operating variables such as, in particular, the load applied to the internal combustion engine.

In respect of lower raw emissions from combustion of the air/fuel mixture, the following approaches are employed: very high injection pressures, special injector designs, an ever increasing number of injections per operating cycle, improved mixture conditioning, higher exhaust gas recirculation rates and in this context also combustion methods such as homogeneous charge compression ignition. The common feature of all these approaches is that very precise knowledge of the cylinder pressure or rather the cylinder pressure variation during combustion is very important.

Depending on the spread of the flame front during combustion of the air/fuel mixture and the variable volume of the combustion chamber of the relevant cylinder as the piston travels, a pressure variation over time is produced which is heavily dependent on the filling of the combustion chamber. The cylinder pressure curve represents the sum of a large number of variables influencing engine operating behavior and is thus also very suitable as a command variable for controlling the internal combustion engine. Important for this purpose, however, is reliable and at the same time cost-effective cylinder pressure measurement.

SUMMARY

A method and a device for operating an internal combustion engine with a plurality of cylinders can be created, wherein the method and device are simple but allowing precise operation of the internal combustion engine.

According to an embodiment, a method for operating an internal combustion engine having a plurality of cylinders, wherein at least one cylinder is implemented as a reference cylinder to which an active cylinder pressure sensor is assigned, and wherein the remaining cylinders are each assigned a passive cylinder pressure sensor, the cylinders each being assigned at least one final control element and a crankshaft angle sensor being provided, may comprise the steps of: —in a quasi-steady-state operating state of the internal combustion engine: —carrying out equalization of cylinder segment times assigned to the individual cylinders by intervening in at least one actuator signal of a final control element assigned to the respective cylinder, —assigning the measurement signal of the active cylinder pressure sensor to the measurement signals of the passive cylinder pressure sensors, —carrying out adjustment of the signal processing of the measurement signals of the passive cylinder pressure sensors as a function of the respective measurement signals of the passive cylinder pressure sensors obtained in the quasi-steady-state operating state and of the assigned measurement signal of the active cylinder pressure sensor.

According to another embodiment, a device for operating an internal combustion engine having a plurality of cylinders, wherein at least one cylinder is implemented as a reference cylinder to which an active cylinder pressure sensor is assigned, and wherein the remaining cylinders are each assigned a passive cylinder pressure sensor, the cylinders each being assigned at least one final control element and a crankshaft angle sensor being provided, may be operable—in a quasi-steady-state operating state BZ_STAT of the internal combustion engine: —to carry out equalization of cylinder segment times assigned to the individual cylinders by intervening in at least one actuator signal of a final control element assigned to the respective cylinder, —to assign the measurement signal of the active cylinder pressure sensor to the respective measurement signals of the passive cylinder pressure sensors, —to adjust the signal processing of the measurement signals of the passive cylinder pressure sensors as a function of the respective measurement signals of the passive cylinder pressure sensors obtained in the quasi-steady-state operating state and of the assigned measurement signal of the active cylinder pressure sensor.

According to a further embodiment, a linear measurement-signal-to-load assignment of the respective passive cylinder pressure sensor can be adjusted in respect of its intercept or its slope. According to a further embodiment, the adjustment of the signal processing of the measurement signals can be carried out as a function of the assigned measurement signal pairs of the active cylinder pressure sensor and of the respective passive cylinder pressure sensor which are determined in at least two different quasi-steady-state operating states of the internal combustion engine with different loads. According to a further embodiment, a linear measurement-signal-to-load assignment of the respective passive cylinder pressure sensor can be adjusted in respect of its intercept and its slope. According to a further embodiment, for different values of the respective measurement signal of the respective passive cylinder pressure sensor, correction values can be determined as a function of the respective measurement signals of the respective passive cylinder pressure sensor and of the respective assigned measurement signal of the active cylinder pressure sensor, and the respective measurement signal of the respective passive cylinder pressure sensor is then assigned to the load as a function of the respective correction values.

BRIEF DESCRIPTION OF THE DRAWINGS

Exemplary embodiments of the invention will now be explained in greater detail with reference to the accompanying schematics in which:

FIG. 2 shows a flowchart of a program for operating the internal combustion engine and FIG. 3 shows another flowchart of a program for operating the internal combustion engine.

Elements of identical design or function are identified by the same reference characters throughout the drawings.

DETAILED DESCRIPTION

Figure 1:
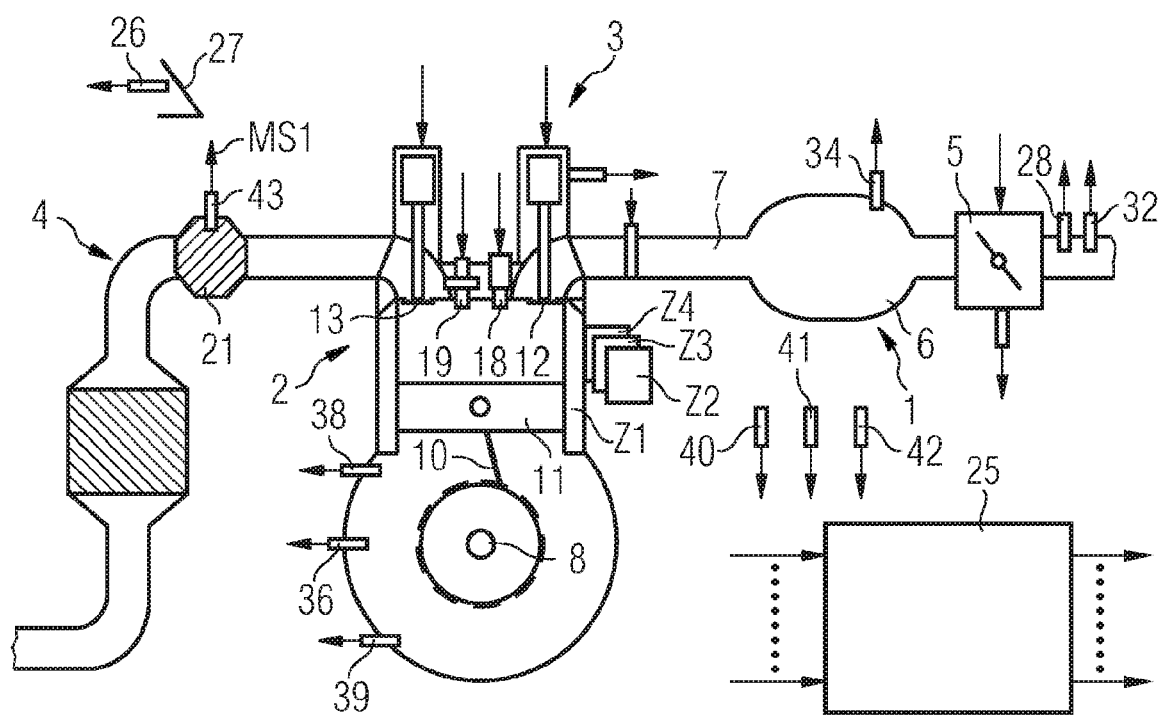
FIG. 1 shows an internal combustion engine.

According to various embodiments, in a method and a corresponding device for operating an internal combustion engine having a plurality of cylinders, at least one cylinder being implemented as a reference cylinder which is characterized in that it is assigned an active cylinder pressure sensor. The remaining cylinders are each assigned a passive cylinder pressure sensor.

An active cylinder pressure sensor is characterized in that its measurement signal is already suitably conditioned in the sensor itself. For this purpose, appropriate electronics may be preferably disposed in the sensor element within the cylinder pressure sensor. In addition, the active cylinder pressure sensor has already been calibrated, in particular precisely calibrated, during its manufacture. For this reason, the active cylinder pressure sensor costs more than the passive cylinder pressure sensors. However, these passive cylinder pressure sensors have, in contrast, only comparatively minimal conditioning or no conditioning at all of the corresponding measurement signal and are not calibrated or only much less precisely calibrated during manufacture. The conditioning of the respective measurement signals of the passive cylinder pressure sensors and also calibration then takes place during operation, preferably in a control device of the internal combustion engine. All in all, they are therefore much cheaper than the active cylinder pressure sensors.

The cylinders of the internal combustion engine are each additionally assigned at least one final control element. In addition, a crankshaft angle sensor is provided. During quasi-steady-state operation of the internal combustion engine, the cylinder segment times assigned to the individual cylinders are equalized by intervening in at least one actuating signal of a final control element assigned to each cylinder. Suitable final control elements can be e.g. an injection valve or even a spark plug. Quasi-steady-state operation is characterized in that the engine speed does not change or changes only insignificantly over corresponding operating cycles during the quasi-steady operating state and accordingly a virtually constant load is applied to the internal combustion engine.

By equalizing the segment times of the individual cylinders, it can be ensured that the individual torque contributions by the respective cylinders to the total torque developed by the internal combustion engine are also equal. The term cylinder segment denotes the crankshaft angle range within an operating cycle of an internal combustion engine during which the torque developed must be attributed to a particular cylinder. The crankshaft angle range assumed by a cylinder segment can be preferably 180° crankshaft angle in the case of a four-stroke cycle internal combustion engine (720 degree crankshaft angle CA divided by the number of cylinders). If the cylinder segments overlap, the crankshaft angle range for a 4-cylinder internal combustion engine may even be more than 180° crankshaft angle, e.g. 240° CA.

In addition, during quasi-steady-state operation, the measurement signal of the active cylinder pressure sensor then continues to be assigned to the measurement signals of the passive cylinder pressure sensors.

During or following quasi-steady-state operation of the internal combustion engine, the signal processing of the measurement signals of the passive cylinder pressure sensors is adjusted as a function of the measurement signals of the passive cylinder pressure sensors (40-42) obtained under quasi-steady-state conditions (BZ_STAT) and of the assigned measurement signal of the active cylinder pressure sensor. This provides a very simple means—using at least one active cylinder pressure sensor only—of also ensuring very precise signal processing of the measurement signals of the passive cylinder pressure sensors.

According to an embodiment, a linear measurement-signal-to-load assignment of the relevant passive cylinder pressure sensor is adjusted in respect of its intercept or slope. Thus, if either the intercept or the slope are known to be correct, the slope or the intercept of the linear measurement-signal-to-load assignment can be adjusted in particularly simple manner, and for this purpose only one pair of recorded measurement signals of the respective passive cylinder pressure sensors and the measurement signal of the active cylinder pressure sensor may even possibly suffice, so that the adjustment can be carried out very quickly.

According to another embodiment, the adjustment of the signal processing of the measurement signals of the passive cylinder pressure sensors is carried out as a function of the assigned measurement signal pairs of the active cylinder pressure sensor and the respective passive cylinder pressure sensor which are determined in at least two different quasi-steady-state operating states of the internal combustion engine with different loads. This allows even more precise adjustment of the signal processing.

According to another embodiment, a linear measurement-signal-to-load assignment of each passive cylinder pressure sensor is adjusted in respect of its intercept and slope, thereby enabling the linear measurement-signal-to-load assignment to be adjusted in respect of all of its degrees of freedom and in particular allowing full calibration to be carried out.

According to another embodiment, correction values are determined for the different values of each measurement signal of the respective passive cylinder pressure sensor, namely as a function of each measurement signal of the respective passive cylinder pressure sensor and of the assigned measurement signal of the active cylinder pressure sensor. The assignment of each measurement signal of the respective passive cylinder pressure sensor to the load subsequently takes place as a function of the respective correction values. In this way the signal processing can also be precisely adjusted in a very simple manner.

An internal combustion engine (FIG. 1) comprises an intake tract 1, an engine block 2, a cylinder head 3 and an exhaust tract 4. The intake tract 1 preferably incorporates a throttle valve 5, as well as a plenum 6 and an intake pipe 7 which leads to a cylinder Z1 via an intake duct in the engine block. The engine block 2 additionally comprises a crankshaft 8 which is coupled to the piston 11 of the cylinder Z1 via a connecting rod 10.

The cylinder head 3 contains a valve train comprising a gas inlet valve 12 and a gas outlet valve 13. The cylinder head 3 additionally incorporates an injection valve 18 and possibly a spark plug 19. Alternatively, the injection valve 18 can also be disposed in the intake pipe 7.

A catalytic converter 21 is provided in the exhaust tract 4.

A control device 25 is provided to which sensors are assigned which detect different measured variables and determine the value of the measured variable in each case. Operating variables include the measured variables and variables derived from these. As a function of at least one of the operating variables, the control device determines manipulated variables which are then converted into one or more actuating signals for controlling the final control elements of the internal combustion engine by means of corresponding actuators. The control device can also be termed a device for operating the internal combustion engine.

The internal combustion engine has a plurality of cylinders Z1-Z4, each cylinder Z1-Z4 then being assigned corresponding final control elements and possibly also sensors.

The sensors are a pedal position transducer 26 which detects a position of an accelerator pedal 27, a mass air flow sensor 28 which detects a mass flow of air from upstream of the throttle valve, a first temperature sensor 32 which measures an intake air temperature, an intake pipe pressure sensor 34 which measures an intake pipe pressure in the plenum 6, a crankshaft angle sensor 36 which measures a crankshaft angle to which an engine speed is then assigned, and a second temperature sensor 38 which measures the temperature in the crankcase.

A cylinder Z1 implemented as a reference cylinder is additionally assigned an active cylinder pressure sensor 39. The remaining cylinders Z2 to Z4 are each assigned a passive cylinder pressure sensor 40 to 42.

A lambda sensor 43 is provided which can be disposed in the catalytic converter 21 or can also be disposed upstream of the catalytic converter 21 and which measures a residual oxygen content of the exhaust gas.

Any subset of the abovementioned sensors can be present or additional sensors can also be present depending on the design of the internal combustion engine.

The final control elements are e.g. the throttle valve 5, the gas inlet and gas outlet valves 12, 13, the injection valve 18 or the spark plug 19. Particularly in the case of a diesel engine, the throttle valve 5 and the spark plug 19 can also be dispensed with.

A program for operating the internal combustion engine is stored in a memory of the internal combustion engine and is executed in the control device 25 during operation of the internal combustion engine. The program is launched in a step S1 in which variables are initialized if necessary. Although the program shown in FIG. 2 can be launched in step S1 e.g. at specified time intervals during operation of the internal combustion engine, it can also be initiated independently thereof whenever predefined operating variables of the internal combustion engine assume predefined values.

In a step S2 it is checked whether the internal combustion engine is in an operating state BZ which is a quasi-steady operating state BZ_STAT. A quasi-steady operating state BZ_STAT is characterized in that the engine speed, considered over the operating cycles of the internal combustion engine, remains essentially constant and the load also remains essentially constant.

If the condition of step S2 is not fulfilled, the program is preferably terminated in step S12. However, if the condition of step S2 is fulfilled, cylinder segment times T_SEG_i assigned to the individual cylinders Z1 to Z4 are equalized in a step S4 by intervening in at least one actuating signal of a final control element assigned to the respective cylinder Z1 to Z4.

In this context an "i" is a placeholder for the relevant cylinder Z1 to Z4, and could also be given in the form of an index. Thus, in the event of four different cylinders being present, "i" can assume e.g. values between 1 and 4.

The cylinder segment times T_SEG_i are preferably equalized by adjusting the actuating signal of the final control element assigned to the respective cylinder Z1 to Z4 for controlling the respective injection valve 19. In this way, for example, the mass of fuel to be metered-in or even the position, referred to the crankshaft angle 8, of the metering-in of the fuel can be varied in a manner whereby the torque is influenced by the respective cylinder Z1 to Z4, and the individual torque contributions produced in the respective cylinders Z1 to Z4 by combustion of the respective air/fuel ratio can thus be equalized. This then also results in equalization of the respective cylinder segment times T_SEG_i.

Alternatively or additionally the position, referred to the crankshaft angle 8, of ignition of the respective air/fuel mixture can also be varied if necessary, thus equalizing the individual torque contributions produced in the respective cylinders Z1 to Z4 by combustion of the respective air/fuel mixture.

In a step S6, assuming that the internal combustion engine remains in the quasi-steady operating state BZ_STAT, the measurement signal MS_P_CYL_REF of the active cylinder pressure sensor 39 of the reference cylinder is then assigned the measurement signals MS_P_CYL_k of the passive cylinder pressure sensors 40-42 of the remaining cylinders. In this way, corresponding measurement signal pairs for each of the remaining cylinders Z2 to Z4 are therefore generated in step S6 which are then used in a step S8.

In this context, a suffixed "k" denotes a placeholder—hereinafter referred to as an I-placeholder—for the remaining cylinders Z2 to Z4 in conjunction with the measurement signal MS_P_CYL_k of the passive cylinder pressure sensor 40 to 42 and can also be given in the form of an index.

In a step S8 there takes place a matching to a signal processing of the measurement signals MS_P_CYL_k of the remaining cylinders to which a passive cylinder pressure sensor 40 to 42 is assigned in each case. Although step S8 can be carried out during the quasi-steady-state operating state BZ_STAT, it does not need to be carried out during the quasi-steady-state operating state BZ_STAT. For example, in step S8 either an intercept OFFS_k or a slope ST_k of a linear measurement-signal-to-load assignment of the respective passive cylinder pressure sensor 40 to 42 can be implemented as a function of the assigned measurement signal MS_P_CYL_REF of the active cylinder pressure sensor 39. Basically, the measurement signals MS_P_CYL_k and MS_P_CYL_REF of both the passive and the active cylinder pressure sensors 39 to 42 can represent e.g. a maximum cylinder pressure during each operating cycle of the relevant cylinder Z1 to Z4 or also, for example, a cylinder pressure averaged over that cycle.

In addition, for the purposes of carrying out step S8, the measurement signals MS_P_CYL_REF and MS_P_CYL_k of the active cylinder pressure sensor 39 and of the respective passive cylinder pressure sensors 40 to 42 can also be averaged e.g. over a plurality of operating cycles, assuming that the same load is applied and that the quasi-steady operating state BZ_STAT obtains. For example, in step S8, the relevant slope ST_k is determined as shown by the formula according to step S10 where LOAD_REF is a reference load assigned to the measurement signal MS_P_CYL_REF of the active cylinder pressure sensor 39.

During subsequent operation of the internal combustion engine, signal processing of the measurement signals MS_P_CYL_k of the passive cylinder pressure sensors 40 to 42 is then carried out by means of the slope ST_k adjusted in step S8 or the intercept OFFS_k adjusted in step S8, and the corresponding load assigned to the respective remaining cylinders Z2 to Z4 is determined.

The process is then terminated in a step S12.

Another program for operating the internal combustion engine will now be explained in greater detail with reference to FIG. 3. In the following description, only the differences compared to the program for operating the internal combustion engine according to the flowchart in FIG. 2 will be explained in further detail. The program is launched in a step S14 corresponding to step S1. Step S16 corresponds to step S2. If the condition of step S16 is not fulfilled, further execution preferably proceeds to a step S17 in which the program remains for a predefined wait time. The wait time is specified such that the condition of S16 is then re-checked after a predefined time. When step S17 has been executed, step S16 is repeated.

If, on the other hand, the condition of step S16 is fulfilled, in a step S18 the cylinder segment times T_SEG_i are equalized analogously to step S4. In a step S20, the measurement signals MS_P_CYL_k_m of the passive cylinder pressure sensors are assigned to the measurement signal MS_P_CYL_REF_m of the active cylinder pressure sensor 39, "m" being a placeholder which could also be present in the form of an index and is representative of a desired number of measurement signal pairs for the respective remaining cylinder Z2 to Z4 and which will hereinafter be referred to as the M-placeholder. However, MG presents a maximum placeholder value, hereinafter referred to as the M-placeholder value.

If this is not the case, step S20 corresponds to step S6. In a step S22 it is checked whether the M-placeholder m is already greater than or equal to the maximum M-placeholder value MG. This is the case if a number of measurement signal pairs for the respective remaining cylinder Z2 to Z4 corresponding to the maximum M-placeholder value MG has been determined during successive iterations of step S20. However, it is important here that the measurement signal pairs were determined in at least two different quasi-steady-state operating states BZ_STAT of the internal combustion engine with different loads. Accordingly in step S16 it can also be additionally interrogated whether the quasi-steady-state operating state BZ_STAT has now been assumed with another load since the last time the quasi-steady-state operating state was assumed. The maximum M-placeholder value MG can assume e.g. the value 2, with the result that the M-placeholder m can assume the values 1 and 2. However, although the maximum M-placeholder value MG can also assume greater values than 2, it is predefined.

If the condition of step S22 is not fulfilled, execution proceeds to step S16. If, on the other hand, the condition of step S22 is fulfilled, in a step S24 the adjustment of the signal processing of the measurement signals MS_P_CYL_k is carried out as a function of the assigned measurement signal pairs of the active cylinder pressure sensor 39 and the respective passive cylinder pressure sensor 40 to 42 which were determined in at least two different quasi-steady-state operating states of the internal combustion engine with different loads in the course of step S20. Otherwise, step S24 corresponds to step S8.

In step S24, in the case of a linear measurement-signal-to-load assignment of the respective passive cylinder pressure sensor 40 to 42, this assignment is preferably adjusted in respect of both its intercept OFFS_k and its slope ST_k. For this purpose the measurement signal pairs assigned to the respective other cylinders Z2 to Z4 are used. If the maximum M-placeholder value MG is greater than 2 in this case, the measurement-signal-to-load assignment can also be approximated. Otherwise the respective intercepts OFFS_k and slopes ST_k can be solved by solving the resulting two-equation system of equations represented by the corresponding measured value pairs.

Execution is then terminated in a step S26.

Alternatively, instead of step S24, correction values KOR_k_n can also be determined in a step S28. "n" is here a placeholder for the different correction values assigned in each case to one of the remaining cylinders Z2 to Z4 for different loads, hereinafter termed an N-placeholder. The N-placeholder "n" can assume values from 1 to a maximum placeholder value NG which is predefined and will hereinafter be referred to as the N-placeholder value. The maximum N-placeholder value NG can be less than or equal to the maximum M-placeholder value MG. Preferably, however, the N-placeholder value NG is equal to the maximum M-placeholder value MG. In this case the relevant correction value KOR_k_n is then determined as a function of the relevant measurement signal MS_P_CYL_REF_m from the $m^{th}$ measurement signal of the active cylinder pressure sensor 39 in the thereto assigned measurement signal MS_P_CYL_k_m of the respective passive cylinder pressure sensor 40 to 42 assigned for the respective remaining cylinder Z2 to Z4. In this way, for each passive cylinder pressure sensor 40 to 42, correction values KOR_k_n are determined in step S18 for the NG different loads, said values then being taken into account during subsequent operation of the internal combustion engine for signal processing of the measurement signals MS_P_CYL_k of the respective passive cylinder pressure sensors.

What is claimed is:

1. A method for operating an internal combustion engine having a plurality of cylinders, wherein at least one cylinder is implemented as a reference cylinder to which an active cylinder pressure sensor is assigned, and wherein the remaining cylinders are each assigned a passive cylinder pressure sensor, wherein the active cylinder pressure sensor has been calibrated prior to operating the internal combustion engine;

wherein each passive cylinder pressure sensor is calibrated during operation;

the cylinders each being assigned at least one final control element and a crankshaft angle sensor being provided, the method comprising the steps of:

in a quasi-steady-state operating state of the internal combustion engine:

carrying out equalization of cylinder segment times assigned to the individual cylinders by intervening in at least one actuator signal of a final control element assigned to the respective cylinder, and assigning the measurement signal of the active cylinder pressure sensor to the measurement signals of the passive cylinder pressure sensors; and carrying out adjustment of the signal processing of the measurement signals of the passive cylinder pressure sensors as a function of the respective measurement signals of the passive cylinder pressure sensors obtained in the quasi-steady-state operating state and of the assigned measurement signal of the active cylinder pressure sensor.

2. The method according to claim 1, wherein a linear measurement-signal-to-load assignment of the respective passive cylinder pressure sensor is adjusted in respect of its intercept or its slope.

3. The method according to claim 1, wherein the adjustment of the signal processing of the measurement signals is carried out as a function of the assigned measurement signal pairs of the active cylinder pressure sensor and of the respective passive cylinder pressure sensor which are determined in at least two different quasi-steady-state operating states of the internal combustion engine with different loads.

4. The method according to claim 3, wherein a linear measurement-signal-to-load assignment of the respective passive cylinder pressure sensor is adjusted in respect of its intercept and its slope.

5. The method according to claim 3, wherein for different values of the respective measurement signal of the respective passive cylinder pressure sensor, correction values are determined as a function of the respective measurement signals of the respective passive cylinder pressure sensor and of the respective assigned measurement signal of the active cylinder pressure sensor, and the respective measurement signal of the respective passive cylinder pressure sensor is then assigned to the load as a function of the respective correction values.

6. A device for operating an internal combustion engine having a plurality of cylinders:
wherein at least one cylinder is implemented as a reference cylinder to which an active cylinder pressure sensor is assigned, and wherein the remaining cylinders are each assigned a passive cylinder pressure sensor, the cylinders each being assigned at least one final control element and a crankshaft angle sensor being provided,
wherein the active cylinder pressure sensor has been calibrated prior to operating the internal combustion engine;
wherein each passive cylinder pressure sensor is calibrated during operation;
wherein the device is operable to:
in a quasi-steady-state operating state BZ_STAT of the internal combustion engine:
to carry out equalization of cylinder segment times assigned to the individual cylinders by intervening in at least one actuator signal of a final control element assigned to the respective cylinder, and
to assign the measurement signal of the active cylinder pressure sensor to the respective measurement signals of the passive cylinder pressure sensors; and
to adjust the signal processing of the measurement signals of the passive cylinder pressure sensors as a function of the respective measurement signals of the passive cylinder pressure sensors obtained in the quasi-steady-state operating state and of the assigned measurement signal of the active cylinder pressure sensor.

7. The device according to claim 6, wherein the device is further operable to adjust a linear measurement-signal-to-load assignment of the respective passive cylinder pressure sensor in respect of its intercept or its slope.

8. The device according to claim 6, wherein the device is further operable to carry out the adjustment of the signal processing of the measurement signals as a function of the assigned measurement signal pairs of the active cylinder pressure sensor and of the respective passive cylinder pressure sensor which are determined in at least two different quasi-steady-state operating states of the internal combustion engine with different loads.

9. The device according to claim 8, wherein the device is further operable to adjust a linear measurement-signal-to-load assignment of the respective passive cylinder pressure sensor in respect of its intercept and its slope.

10. The device according to claim 8, wherein the device is further operable to determine, for different values of the respective measurement signal of the respective passive cylinder pressure sensor, correction values as a function of the respective measurement signals of the respective passive cylinder pressure sensor and of the respective assigned measurement signal of the active cylinder pressure sensor, and the respective measurement signal of the respective passive cylinder pressure sensor is then assigned to the load as a function of the respective correction values.

* * * * *